United States Patent
Izumi et al.

(10) Patent No.: US 7,405,258 B2
(45) Date of Patent: Jul. 29, 2008

(54) METHOD FOR PRODUCING POLYURETHANE EMULSION FOR AQUEOUS ONE-COMPONENT COATING AGENT

(75) Inventors: Naotaka Izumi, Yokohama (JP); Takeshi Morishima, Yokohama (JP); Iku Ohki, Yokohama (JP); Mitsushige Ikemoto, Yokohama (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 0 days.

(21) Appl. No.: 10/591,422

(22) PCT Filed: Feb. 1, 2005

(86) PCT No.: PCT/JP2005/001387

§ 371 (c)(1),
(2), (4) Date: Feb. 20, 2007

(87) PCT Pub. No.: WO2005/083021

PCT Pub. Date: Sep. 9, 2005

(65) Prior Publication Data

US 2007/0155894 A1    Jul. 5, 2007

(30) Foreign Application Priority Data

Mar. 1, 2004 (JP) .............................. 2004-056294

(51) Int. Cl.
*C08J 3/00* (2006.01)
*C08K 3/20* (2006.01)
*C08L 75/00* (2006.01)

(52) U.S. Cl. .................. 524/591; 524/839; 524/840

(58) Field of Classification Search ................. 524/591, 524/839, 840
See application file for complete search history.

(56) References Cited

U.S. PATENT DOCUMENTS 4,501,852 A * 2/1985 Markusch et al. ........... 524/591

FOREIGN PATENT DOCUMENTS

| JP | 7-507086 A | 8/1995 |
| JP | 11-228654 A | 8/1999 |
| JP | 2001-213935 A | 8/2001 |
| JP | 2002-211110 A | 7/2002 |
| JP | 2003-183574 A | 7/2003 |
| JP | 2003-226728 A | 8/2003 |
| JP | 2003-253199 A | 9/2003 |
| JP | 2003-253200 A | 9/2003 |
| JP | 2004-107496 A | 4/2004 |

\* cited by examiner

*Primary Examiner*—Patrick D Niland
(74) *Attorney, Agent, or Firm*—Sughrue Mion, PLLC

(57) ABSTRACT

[PROBLEMS] The invention is to provide an aqueous one-component coating agent that is environmentally friendly and safe, and is excellent in productivity and storage stability, and also in alkali resistance and solvent resistance of a coated film.

[MEANS FOR SOLVING PROBLEMS] The problems are solved by providing a method for producing polyurethane emulsion for an aqueous one-component coating agent, comprising: reacting an organic diisocyanate (a1), a high molecular weight polyol (a2) and a low molecular weight glycol containing a carboxyl group (a3) to produce an isocyanate-terminated urethane prepolymer having a carboxyl group (A); mixing the urethane prepolymer (A) with a polyisocyanate containing a nonionic polar group (B); neutralizing the carboxyl group in the system with a neutralizing agent (C); and subjecting the mixture to emulsification in water and chain extension with water or an amine.

5 Claims, No Drawings

METHOD FOR PRODUCING POLYURETHANE EMULSION FOR AQUEOUS ONE-COMPONENT COATING AGENT

TECHNICAL FIELD

The present invention relates to a method for producing polyurethane emulsion for an aqueous one-component coating. More specifically, it relates to a method for producing such polyurethane emulsion for an aqueous one-component coating agent that is environmentally friendly and safe, and is excellent in productivity, storage stability, and alkali resistance and solvent resistance of a coated film.

BACKGROUND ART

A coating agent containing an organic solvent in a large amount involves a safety and health problem, such as adverse affect on human bodies, explosion and fire disaster, and an environmental pollution problem, such as atmospheric pollution. In order to eliminate the problems, various aqueous systems are being developed actively in recent years. A urethane coating agent exhibits good adhesion property to various kinds of substrates. Accordingly, there is an increasing demand of an aqueous urethane coating agent.

Patent Document 1 discloses an aqueous polyurethane resin obtained by mixing a urethane prepolymer having a carboxyl group and an isocyanate group and having water dispersibility through neutralization of the carboxyl group with a basic compound, with a water non-emulsifiable polyisocyanate, followed by subjecting to emulsification and chain extension in water.

Patent Document 1: JP-A-7-188371

However, it has been found that the aqueous urethane resin disclosed in Patent Document 1 is still insufficient in property of the coated film.

DISCLOSURE OF THE INVENTION

Advantage of the Invention

According to the invention, such an aqueous one-component coating agent can be provided that is environmentally friendly and safe, and is excellent in productivity, storage stability, and alkali resistance and solvent resistance of a coated film.

Problems to be Solved by the Invention

An object of the invention is to provide such an aqueous one-component coating agent that is environmentally friendly and safe, and is excellent in productivity, storage stability, and alkali resistance and solvent resistance of a coated film.

Means for Solving the Problems

The invention is based on investigations for solving the aforementioned problems, and it has been found that polyurethane emulsion obtained by emulsifying a particular polyisocyanate in water and subjecting to a chain extension reaction is suitable for an one-component coating agent, thereby completing the invention.

Accordingly, the invention is as shown in the following items (1) to (5).

(1) A method for producing polyurethane emulsion for an aqueous one-component coating agent, comprising:
reacting an organic diisocyanate (a1), a high molecular weight polyol (a2) and a low molecular weight glycol containing a carboxyl group (a3) to produce an isocyanate-terminated urethane prepolymer having a carboxyl group (A);
mixing the urethane prepolymer (A) with a polyisocyanate containing a nonionic polar group (B);
neutralizing the carboxyl group in the system with a neutralizing agent (C); and
subjecting the mixture to emulsification in water and chain extension with water.

(2) A method for producing polyurethane emulsion for an aqueous one-component coating agent, comprising:
reacting an organic diisocyanate (a1), a high molecular weight polyol (a2) and a low molecular weight glycol containing a carboxyl group (a3) to produce an isocyanate-terminated urethane prepolymer having a carboxyl group (A);
mixing the urethane prepolymer (A) with a polyisocyanate containing a nonionic polar group (B);
neutralizing the carboxyl group in the system with a neutralizing agent (C); and
subjecting the mixture to emulsification in water and chain extension with an amine.

(3) The production method of item (1) or (2) above, wherein the organic diisocyanate (a1) is an aliphatic diisocyanate and/or an alicyclic diisocyanate.

(4) The production method of any one of items (1) to (3) above, wherein the high molecular weight polyol (a2) has a carbonate skeleton.

(5) The production method of any one of items (1) to (4) above, wherein the polyisocyanate containing a nonionic polar group (B) is an isocyanurate modified product or a composite modified product including isocyanurate modification of an aliphatic diisocyanate and/or an alicyclic diisocyanate.

BEST MODE FOR CARRYING OF THE INVENTION

The invention will be described in more detail. The isocyanate-terminated urethane prepolymer having a carboxyl group (A) constituting the invention is obtained by reacting an organic diisocyanate (a1), a high molecular weight polyol (a2) and a low molecular weight glycol containing a carboxyl group (a3).

The content of a carboxylate salt in (A) is preferably from 0.1 to 2 mmol/g, and particularly preferably from 0.2 to 1.8 mmol/g. In the case where the content of a carboxylate salt is too small, it is difficult to obtain the target polyurethane emulsion. In the case where it is too large, it might bring about increase in viscosity upon emulsification and deterioration in durability of the coated film.

Examples of the organic diisocyanate (a1) used in the invention include an aromatic diisocyanate, such as 2,4-tolylene diisocyanate, 2,6-tolylene diisocyanate, xylene-1,4-diisocyanate, xylene-1,3-diisocyanate, 4,4'-diphenylmethane diisocyanate, 2,4'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthyelne-1,4-diisocyanate, naphthylene-1,5-diisocyanate and 3,3'-dimethoxydiphenyl-4,4'-diisocyanate, an aromatic polyisocyanate, such as polyphenylenepolymethylene polyisocyanate and crude tolylene diisocyanate, an aliphatic diisocyanate, such as tetramethylene diisocyanate, hexamethylene diisocyanate, decamethylene diisocyanate and lysine diisocyanate, and an alicyclic diisocyanate, such as hydrogenated tolylene diisocyanate, hydrogenated xylene diisocyanate, hydrogenated diphenylmethane diisocyanate and tetramethylxylene diisocyanate. An allophanate modified product, a urea modified product, a biuret modified product, an uretodione modified product and an isocyanurate modified product thereof may be used in combination.

The organic diisocyanate in the invention is preferably an aliphatic diisocyanate and an alicyclic diisocyanate in consideration of strength and weather resistance of the film, and among these, hexamethylene diisocyanate and isophorone diisocyanate are particularly preferred.

Examples of the high molecular weight polyol (a2) used in the invention include polyester polyol, polyesteramide polyol, polyether polyol, polyether polyester polyol, polycarbonate polyol and polyolefin polyol, which have a number average molecular weight of from 500 to 10,000, and preferably from 500 to 5,000, and the high molecular weight polyol may be used solely or in combination thereof.

Examples of the polyester polyol and the polyesteramide polyol include those obtained from a polycarboxylic acid and a polycarboxylic acid derivative, such as an acid ester, an acid anhydride and an acid halide, and a low molecular weight polyol, a low molecular weight polyamine and a low molecular weight aminoalcohol, which have a (number average) molecular weight of less than 500.

Examples of the polycarboxylic acid include succinic acid, adipic acid, sebacic acid, azelaic acid, terephthalic acid, isophthalic acid, orthophthalic acid, hexahydroterephthalic acid and hexahydroisophthalic acid.

Examples of the low molecular weight polyol having a (number average) molecular weight of less than 500 include ethylene glycol, 1,3-propylene glycol, 1,2-propylene glycol, 1,2-butanediol, 1,3-butanediol, 1,4-butane diol, 1,5-pentanediol, 1,6-hexanediol, 3-methyl-1,5-pentanediol, neopentyl glycol, 1,8-octanediol, 1,9-nonanediol, 3,3-dimethylolpropane, diethylene glycol, 1,4-cyclohexanediol, 1,4-cyclohexanedimethanol, 2-ethyl-1,3-propanediol, 2-n-propyl-1,3-propanediol, 2-isopropyl-1,3-propanediol, 2-n-butyl-1,3-propanediol, 2-isobutyl-1,3-propanediol, 2-tert-butyl-1,3-propanediol, 2-methyl-2-ethyl-1,3-propanediol, 2,2-diethyl-1,3-propanediol, 2-ethyl-2-n-propyl-1,3-propanediol, 2-ethyl-2-n-butyl-1,3-propanediol, 2-ethyl-3-ethyl-1,4-butanediol, 2-methyl-3-ethyl-1,4-butanediol, 2,3-diethyl-1,5-pentanediol, 2,4-diethyl-1,5-pentanediol, 2,3,4-triethyl-1,5-pentanediol, trimethylolpropane, dimethylolpropionic acid, dimethylolbutanoic acid, dimer acid diol, glycerin, pentaerythritol, and an alkylene oxide adduct of bisphenol A.

Examples of the low molecular weight polyamine having a (number average) molecular weight of less than 500 include ethylenediamine, hexamethylenediamine, xylylenediamine, isophoronediamine and diethylenetriamine.

Examples of the low molecular weight aminoalcohol having a (number average) molecular weight of less than 500 include monoethanolamine, diethanolamine and xnonopropanolamine. Such a polyester polyol is also preferably used as a lactone polyester polyol obtained by ring-opening polymerization of a cyclic ester (lactone), such as ε-caprolactone, an alkyl-substituted ε-caprolactone, δ-valerolactone and an alkyl-substituted δ-valerolactone.

Examples of the polyether polyol include polyethylene glycol, polypropylene ether polyol and polytetramethylene ether polyol.

Examples of the polyether polyester polyol include a polyester polyol produced from the aforementioned polyether polyol and the aforementioned polycarboxylic acid derivative.

Examples of the polycarbonate polyol include those obtained by ethanol elimination condensation reaction of a low molecular weight polyol and diethyl carbonate, phenol elimination condensation reaction of a low molecular weight polyol and diphenyl carbonate, and ethylene glycol elimination condensation reaction of a low molecular weight polyol and ethylene carbonate. Examples of the low molecular weight polyol used herein include those low molecular weight polyols used for obtaining the polyester polyol.

Specific examples of the polyolefin polyol include hydroxyl-terminated polybutadiene and a hydrogenated product thereof, and a hydroxyl group-containing chlorinated polyolefin.

The high molecular weight polyol (a2) preferably has a carbonate skeleton in consideration of the flexibility, various durability properties and adhesion property of the film formed of the polyurethane emulsion obtained in the invention.

Examples of the low molecular weight glycol containing a carboxyl group (a3) used in the invention include 2,2-dimethylolpropionic acid, 2,2-dimethylolbutanoic acid, 2,2-dimethylolbutyric acid and 2,2-dimethylolvaleric acid.

Examples of the polyisocyanate containing a nonionic polar group (B) include a non-modified polyisocyanate, such as polyphenylene polymethylene polyisocyanate and crude tolylene diisocyanate, and a urethane modified product, a urea modified product, an allophanate modified product, a biuret modified product, an uretodione modified product and an isocyanurate modified product of the aforementioned organic diisocyanates, and those obtained by reacting the composite modified product as a base polyisocyanate with an active hydrogen-containing compound having a nonionic polar group.

In consideration of the various durability properties and adhesion property of the film formed of the polyurethane emulsion obtained in the invention, the base polyisocyanate of the polyisocyanate containing a nonionic polar group (B) is preferably an isocyanurate modified product or a composite modified product containing an isocyanurate modification of an aliphatic diisocyanate and/or an alicyclic diisocyanate (which is hereinafter referred collectively to as an isocyanurate modified non-yellowing polyisocyanate). The aliphatic diisocyanate is preferably hexamethylene diisocyanate, and the alicyclic diisocyanate is preferably isophorone diisocyanate.

The isocyanurate modified non-yellowing polyisocyanate will be described in more detail. Examples of a production method of the isocyanurate modified non-yellowing polyisocyanate include the following methods. (1) An isocyanuration catalyst is added to an aliphatic isocyanate and/or an alicyclic isocyanate to effect an isocyanuration reaction, and then the unreacted aliphatic isocyanate and/or alicyclic isocyanate is removed. (2) An aliphatic isocyanate and/or an alicyclic isocyanate is reacted with a low molecular weight polyol used for obtaining the polyester polyol, and then an isocyanuration catalyst is added thereto to effect an isocyanuration reaction, followed by removing the unreacted aliphatic isocyanate and/or alicyclic isocyanate. (3) A part of the isocyanate group of the polyisocyanate obtained in the method (1) or (2) is further subjected to a urethanation reaction with a monofunctional or polyfunctional polyol.

Examples of the isocyanuration catalyst used in the production methods (1) and (2) include a tetraalkylammonium hydroxide, such as tetramethylammonium hydroxide and tetrabutylammonium hydroxide, an organic weak acid salt, such as tetramethylammonium acetate, tetraethylammonium acetate and tetrabutylammonium acetate, a trialkylhydroxyalkylammonium hydroxide, such as trimethylhydroxypropylammonium hydroxide, trimethylhydroxyethylammonium hydroxide, triethylhydroxypropylammonium hydroxide and triethylhydroxyethylammonium hydroxide, an organic weak acid salt, such as trimethylhydroxypropylammonium acetate, trimethylhydroxyethylammonium acetate, triethylhydroxypropylammonium acetate and triethylhydroxyethylammonium acetate, a tertiary amine, such as triethylamine and triethylenediamine, and a metallic salt of an alkylcarboxylic acid, such as acetic acid, caproic acid, octylic acid and myristic acid.

The addition amount of the catalyst for the isocyanuration reaction is preferably from 10 to 10,000 ppm with respect to the reaction system. The reaction rate is preferably 40% or less, and more preferably 35% or less. The isocyanuration temperature is preferably from 0 to 120° C., and particularly preferably from 20 to 100° C.

Examples of the nonionic polar group include an oxyethylene group. Examples of the active hydrogen-containing compound having the nonionic polar group include those obtained by subjecting a low molecular weight active hydrogen-containing compound, for example, a low molecular weight monool, such as methanol, ethanol, n-propanol, isopropanol, n-butanol, isobutanol, t-butanol, cyclohexanol and cyclohexanemethanol, a low molecular weight polyol, such as ethylene glycol, propylene glycol and glycerin, a low molecular weight monoamine, such as butylamine and aniline, a low molecular weight polyamine, such as ethylenediamine, hexamethylenediamine and isophoronediamine, and a phenol compound, such as phenol and hydroquinone, as an initiator, to ring-opening addition with an alkylene oxide including ethylene oxide. The content of the nonionic polar group in the resulting active hydrogen-containing compound having the nonionic polar group is preferably 50% or more, and particularly preferably 70% or more. The initiator is preferably a low molecular weight monool, and particularly preferably methanol and ethanol, in consideration of the viscosity of the resulting polyisocyanate containing a nonionic polar group and the alkali resistance of the film.

Examples of the neutralizing agent (C) used in the invention include an organic amine, such as ethylamine, trimethylamine, triethylamine, triisopropylamine, tributylamine, triethanolamine, triisopropanolamine, N-methyldiethanolamine, N-phenyldiethanolamine, monoethanolamine, N,N-dimethylethanolamine, N,N-diethylethanolamine, morpholine, N-methylmorpholine and 2-amino-2-ethyl-1-propanol, an alkali metal, such as lithium, potassium and sodium, an inorganic alkali, such as sodium hydroxide and potassium hydroxide, and ammonia. In consideration of the weather resistance and alkali resistance after drying, those having high volatility capable of easily dissociated under heat or an aminoalcohol capable of reacting with a polyisocyanate curing agent are preferred, and ammonia, trimethylamine, triethylamine and N,N-dimethylaminoethanol are preferred.

A blocking agent may be used in the invention depending on necessity. Examples of the blocking agent include a phenol compound, such as phenol, cresol, ethylphenol and butylphenol, an alcohol compound, such as 2-hydroxypyridine, butylcellosolve, propylene glycol monomethyl ether, ethylene glycol, benzyl alcohol, methanol, ethanol, n-butanol, isobutanol and 2-ethylhexanol, an active methylene compound, such as dimethyl malonate, diethyl malonate, methyl acetoacetate, ethyl acetoacetate and acetylacetone, a mercaptan compound, such as butylmercaptan and dodecylmercaptan, an acid amide compound, such as acetanilid and acetic acid amide, a lactam compound, such as ε-caprolactam, δ-valerolactam and γ-butyrolactam, an acid imide compound, such as succinic acid imide and maleic acid imide, an imidazole compound, such as imidazole and 2-methylimidazole, a urea compound, such as urea, thiourea and ethyleneurea, an oxime compound, such as formaldehydeoxime, aetoaldoxime, acetoneoxime, methyl ethyl ketoxime, methyl isobutyl ketoxime and cyclohexanoneoxime, and an amine compound, such as diphenylaniline, aniline, carbazole, ethyleneimine and polyethyleneimine.

The production method will be specifically described. Firstly, the organic diisocyanate (a1), the high molecular weight polyol (a2) and the low molecular weight glycol containing a carboxyl group (a3) are reacted under the condition of (hydroxyl group)<(isocyanate group), to produce the isocyanate-terminated urethane prepolymer having a carboxyl group (A). A known urethanation. catalyst may be used herein. The reaction temperature is preferably from 0 to 100° C., and particularly preferably from 20 to 90° C.

Upon producing the prepolymer, an arbitrary solid component may be diluted in an organic solvent that is inactive to an isocyanate group. Examples of the organic solvent include an aromatic solvent, such as toluene, xylene, Swasol (an aromatic hydrocarbon solvent, produced by Cosmo Oil Co., Ltd.) and Solvex (an aromatic hydrocarbon solvent, produced by Exxon Chemical Co.), an alicyclic hydrocarbon solvent, such as cyclohexane and isophorone, a ketone solvent, such as acetone, methyl ethyl ketone, methyl isobutyl ketone and cyclohexanone, an ester solvent, such as ethyl acetate, butyl acetate and isobutyl acetate, a glycol ether ester solvent, such as ethylene glycol monoethyl ether acetate, propylene glycol monomethyl ether acetate, propylene glycol 3-methyl-3-methoxybutyl acetate and ethylene glycol ethyl-3-ethoxypropionate, a glycol ether solvent, such as ethylene glycol dimethyl ether, diethylene glycol dibutyl ether, propylene glycol dibutyl ether and dipropylene glycol dimethyl ether, and an ether solvent, such as tetrahydrofuran and dioxane. The solvent may be contained solely or in combination of two or more kinds thereof.

A glycol ether ester solvent and a glycol ether solvent, which have a high vapor pressure and exhibit no firing point in emulsion, are preferred in the invention, and a glycol ether solvent, which is excellent in hydrolysis resistance, is particularly preferred.

The polyisocyanate containing a nonionic polar group (B) is mixed with the resulting isocyanate-terminated urethane prepolymer having a carboxyl group (A), and then the carboxyl group is neutralized with the neutralizing agent (C). In the case where a blocking agent is used, it is preferred that the blocking agent is used before neutralization in consideration of the viscosity of the reaction system. The polyisocyanate containing a nonionic polar group (B) may be mixed with the isocyanate-terminated urethane prepolymer having a carboxyl group after neutralization thereof. However, the viscosity of the system is increased when the system is neutralized on ahead (further blocked in some cases) to make difficult the mixing operation with (B), and therefore, the mixing operation is preferably effected in advance. It is important that the neutralization operation is effected before emulsification. Precipitates and suspended solids are liable to occur when the neutralization operation is effected simultaneously with or after emulsification.

The mixing ratio by weight of (B) with respect (A) (A)/(B) is preferably from 100/10 to 100/100, and particularly preferably from 100/20 to 100/100. In the case where the amount of (B) is too small, the strength and durability of the film might be insufficient. In the case where the amount of (B) is too large, the emulsification might be difficult.

Upon carrying out blocking, it is preferred that the reaction temperature therefor is from 20 to 100° C., and preferably from 30 to 90° C. A known urethanation catalyst may be used herein. The blocking ratio is preferably 20% by mol or less, and particularly preferably from 30 to 50% by mol. In the case where the blocking ratio is too low, the strength and durability of the film might be insufficient. The neutralization operation may be effected under ordinary neutralization reaction condition of from 20 to 50° C.

Subsequently, the mixture is emulsified in water to effect chain extension reaction with water or an amine. Examples of the chain extension agent include a low molecular weight polyamine having a (number average) molecular weight of less than 500, such as ethylenediamine, hexamethylenediamine, xylylenediamine, isophoronediamine, diethylenetriamine and N-aminoethyl-N-ethanolamine, as well as water.

In the case where the low molecular weight polyamine is used, such a chain extension reaction may be carried out as a method of charging the mixture of (A) and (B) in a polyamine aqueous solution, which is obtained in advance by dissolving the polyamine in water, so as to effect emulsification and the chain extension reaction, and a method of emulsifying the mixture of (A) and (B) in water, and then charging a polyamine aqueous solution, which is obtained by dissolving the polyamine in water, so as to effect the chain extension reaction.

Upon effecting the chain extension reaction, it is important that the reaction system is not sealed since a reaction of eliminating carbon dioxide gas occurs through reaction of the isocyanate group with water.

The reaction reaches the end point when the formation of carbon dioxide gas is terminated with no isocyanate group remaining. The reaction temperature upon chain extension is preferably from 20 to 50° C.

The polyurethane emulsion obtained in the invention preferably has an average particle diameter of 500 nm or less, and particularly preferably 300 nm or less. In the case where the average particle diameter is too large, precipitates and suspended solids might occur.

An additive and an assistant that are ordinarily used in an aqueous system may be added to the aqueous polyurethane emulsion obtained in the invention. Examples of the additive and assistant include a pigment, a dye, an antiseptic, an antifungal agent, an antibacterial agent, a thixotropic agent, an antiblocking agent, a dispersion stabilizer, a viscosity controlling agent, a film forming assistant, a leveling agent, an antigelation agent, a light stabilizer, an antioxidant, an ultraviolet ray absorbent, an inorganic or organic filler, a plasticizer, a lubricant, an antistatic agent, a reinforcing agent and a catalyst.

An aqueous coating agent using the polyurethane emulsion obtained in the invention will be described.

As a method for using the aqueous coating agent using the polyurethane emulsion obtained in the invention, it is coated on a substrate, and after drying, it is heated to form a coated film. The temperature upon coating on the substrate is preferably less than 80° C. or ordinary temperature for preventing dripping upon coating. The substrate preferably has heat resistance for effecting heat curing after coating the coating agent, and specifically, a substrate having a heat deformation temperature of 80° C. or more is preferred. Examples of the substrate include a metallic substrate, such as iron, copper, aluminum and stainless steel, heat-resistant plastics, such as an epoxy resin, a phenol resin, a polyamide resin and a polysulfone resin, ceramics, glass, concrete and stone. A metallic substrate is preferred in the invention. The coated amount of the coating agent is preferably from 1 to 300 $g/m^2$, and particularly preferably from 1 to 200 $g/m^2$, in terms of 100% by weight of the solid content.

As a coating method, such a known method may be employed as doctor blade coating, reverse roll coating, gravure roll coating, spinner coating, extruder coating, spray coating, dip coating, flow coating and wire coating.

After coating the coating agent on the substrate, the coating agent is heat cured at a temperature of from 80 to 300° C., and preferably from 100 to 280° C. The heating time is preferably from 10 seconds to 10 minutes, and particularly preferably from 20 seconds to 5 minutes. A sufficient film strength can be exhibited in a short period of time in the invention, and therefore, a too long heating time not only brings about dissipation of energy, but also applies unnecessary thermal history to the coating agent layer.

The conventional one-component aqueous coating agent is not always sufficient in physical property of the film and is particularly insufficient in durability. However, the aqueous one-component coating agent using the polyurethane emulsion of the invention exhibits such a physical property of the film that is equivalent to that of a two-component agent. Furthermore, the coating agent of the invention also has such an advantage that a mixing operation of liquids immediately before use can be avoided owing to the sufficient physical property provided by the one-component agent, whereby defects in physical property of the film due to malpractice upon mixing can be avoided.

EXAMPLES

The invention will be described in more detail with reference to examples and comparative examples, but the invention should not be construed as being limited thereto. In the examples and comparative examples, all the "percent" mean "percent by weight".

Production of Isocyanurate Modified Non-yellowing Polyisocyanate

Synthesis Example 1

300 g of hexamethylene diisocyanate (HDI) and 2.8 g of 1,3-butanediol (1,3-BD) were charged in a 500-mL reactor vessel equipped with a stirrer, a thermometer, a nitrogen sealing tube and a condenser, and after substituting the interior of the reactor vessel with nitrogen, the system was heated to 80° C. under stirring and reacted at that temperature for 2 hours. The measurement of the isocyanate content of the reaction solution revealed that it was 48.6%. 0.06 g of potassium caprate as a catalyst and 0.3 g of phenol as an auxiliary catalyst were added thereto to effect an isocyanuration reaction at 60° C. for 6 hours. 0.042 g of phosphoric acid as a terminating agent was added to the reaction solution, and after stirring at the reaction temperature for 1 hour, free HDI was removed by thin film evaporation under conditions of 120° C. and 1.3 kPa to obtain an isocyanurate modified polyisocyanate NCO-1. NCO-1 was a light yellow transparent liquid and had an isocyanate content of 21.3%, a viscosity of 2,200 mPa·s at 25° C., and a free HDI content of 0.3%.

Production of Polyisocyanate Containing Nonionic Polar Group

Synthesis Example 2

300 g of NCO-1 and 48 g of methoxypolyethylene glycol having a number average molecular weight of 400 were charged in the same apparatus as in Synthesis Example 1, and after substituting the interior of the reactor vessel with nitrogen, the system was heated to 80° C. under stirring and reacted at that temperature for 2 hours to obtain an isocyanurate modified polyisocyanate NCO-2. NCO-2 was a light yellow transparent liquid and had an isocyanate content of 16.9%, a viscosity of 2,300 mPa·s at 25° C., and a free HDI content of 0.3%.

Production of Polyurethane Emulsion

Example 1

188.5 g of a polyol-1, 55.8 g of 2,2-dimethylolbutanoic acid (DMBA) and 118 g of dipropylene glycol dimethyl ether (DMFDG) were charged in a 3,000-mL reactor vessel equipped with a stirrer, a thermometer, a nitrogen sealing tube and a condenser, and were dissolved under heating to 90° C. for 10 minutes. After cooling to 60° C., 217.6 g of isophorone diisocyanate (IPDI) and 0.04 g of dioctyltin dilaurate (DOTDL) were charged therein, and the system was reacted at 80° C. for 2 hours to obtain a solution of an isocyanate-terminated prepolymer containing a carboxyl group. The prepolymer solution had an isocyanate content of 3.07% and a carboxylic acid induction amount in the prepolymer of 0.75 mmol/g. 100 g of NCO-2 was charged therein, and after mixing uniformly, 38.1 g of triethylamine (TEA) was charged to neutralize the carboxyl group. 875 g of water was then charged therein under stirring to effect emulsification and chain extension reaction with water at 30° C. for 12 hours. Formation of carbon dioxide gas was observed during the reaction. A filling operation was carried out at the time when no isocyanate group was observed by FT-IR to obtain an aqueous polyurethane emulsion PU-1. PU-1 had a solid content of 34.9%, an average particle diameter of 46 nm and a viscosity of 139 mPa·s at 25° C.

Examples 2, 3 and 5 and Comparative Examples 2 and 4

Aqueous polyurethane emulsions PU-2 to PU-5, PU-7 and PU-9 were obtained in the same manner as in Example 1 with the same reaction apparatus as in Example 1 by using the raw materials shown in Tables 1 and 2. PU-9 was not subjected to the subsequent evaluation due to occurrence of precipitates.

Example 4

348.4 g of a polyol-2, 25.8 g of DMBA and 224 g of DMFDG were charged in the same reactor vessel as in Example 1, and were dissolved under heating to 90° C. for 10 minutes. After cooling to 60° C., 108.3 g of IPDI and 0.04 g of DOTDL were charged therein, and the system was reacted at 80° C. for 2 hours to obtain a solution of an isocyanate-terminated prepolymer containing a carboxyl group. The prepolymer solution had an isocyanate content of 1.66% and a carboxylic acid induction amount in the prepolymer of 0.35 mmol/g. 100 g of NCO-2 was charged therein, and after mixing uniformly, 17.6 g of TEA was charged to neutralize the carboxyl group. 1,000 g of water was then charged therein under stirring to effect emulsification. Immediately after emulsification, an amine aqueous solution (obtained by mixing 213 g of water, 193.2 g of isophoronediamine and 7.3 g of monoethanolamine) was charged therein to effect chain extension reaction with amine at 30° C. for 12 hours. The reaction solution was filled at the time when no isocyanate group was observed by FT-IR to obtain an aqueous polyurethane emulsion PU-4. PU-4 had a solid content of 35.0%, an average particle diameter of 85 nm and a viscosity of 68 mPa·s at 25° C.

Comparative Example 1

377,0 g of a polyol-1, 111.6 g of DMBA and 195 g of DMFDG were charged in the same reactor vessel as in Example 1, and were dissolved under heating to 90° C. for 10 minutes. After cooling to 60° C., 435.2 g of IPDI and 0.04 g of DOTDL were charged therein, and the system was reacted at 80° C. for 2 hours to obtain a solution of an isocyanate-terminated prepolymer containing a carboxyl group. The prepolymer solution had an isocyanate content of 3.40% and a carboxylic acid induction amount in the prepolymer of 0.75 mmol/g. After charging 76.2 g of TEA to neutralize the carboxyl group, 1,430 g of water was charged therein under stirring to effect emulsification and chain extension reaction with water at 30° C. for 12 hours. Formation of carbon dioxide gas was observed during the reaction. The reaction solution was filled at the time when no isocyanate group was observed by FT-IR to obtain an aqueous polyurethane emulsion PU-6. PU-6 had a solid content of 35.1%, an average particle diameter of 35 nm and a viscosity of 154 mPa·s at 25° C.

Comparative Example 3

1,000 g of NCO-2 was charged in the same reactor vessel as in Example 1. 1,447 g of water was then charged therein under stirring to effect emulsification and chain extension reaction with water at 30° C. for 12 hours. Formation of carbon dioxide gas was observed during the reaction. The reaction solution was filled at the time when no isocyanate group was observed by FT-IR to obtain an aqueous polyurethane emulsion PU-8. PU-8 had a solid content of 40.2%, an average particle diameter of 195 nm and a viscosity of 32 mPa·s at 25° C.

The charged amounts of the raw materials and the production results of Examples and Comparative Examples are shown in Tables 1 and 2.

TABLE 1

|  | Example | | | | |
| --- | --- | --- | --- | --- | --- |
|  | 1 | 2 | 3 | 4 | 5 |
| High molecular weight polyol (g) | | | | | |
| Polyol-1 | 188.5 | 188.5 | 234.0 | | |
| Polyol-2 | | | | 348.4 | 348.4 |
| Carboxyl group-containing low molecular weight glycol (g) DMBA | 55.8 | 55.8 | 34.6 | 25.8 | 25.8 |
| Organic diisocyanate (g) IPDI | 217.6 | 217.6 | 207.8 | 108.3 | 108.3 |
| Carboxylic acid content of prepolymer (mmol/g) | 0.75 | 0.75 | 0.47 | 0.35 | 0.35 |
| Urethanation catalyst (g) DOTDL | 0.04 | 0.04 | 0.04 | 0.04 | 0.04 |
| Diluent (g) DMFDG | 118 | 138 | 141 | 224 | 191 |

TABLE 1-continued

|  | Example | | | | |
|---|---|---|---|---|---|
|  | 1 | 2 | 3 | 4 | 5 |
| Isocyanate content of prepolymer solution (%) | 3.07 | 3.17 | 3.18 | 1.66 | 1.74 |
| Nonionic polyisocyanate (g) NCO-2 | 100 | 200 | 200 | 100 | 200 |
| Prepolymer/nonionic polyisocyanate | 100/20 | 100/40 | 100/40 | 100/20 | 100/40 |
| Neutralizing agent (g) TEA (added before emulsification) | 38.1 | 38.1 | 23.6 | 17.6 | 17.6 |
| Dispersion medium and chain extension agent (g) Water | 875 | 1,034 | 1,072 | 1,000 | 1,042 |
| Dispersion medium (g) Water | | | | 213 | |
| Amine aqueous solution (g) | | | | | |
| Chain extension agent IPDA | | | | 193.2 | |
| Reaction terminating agent MEA | | | | 7.3 | |
| Production results | | | | | |
| Name of aqueous polyurethane emulsion | PU-1 | PU-2 | PU-3 | PU-4 | PU-5 |
| Appearance | good | good | good | good | good |
| Solid content (%) | 34.9 | 35.0 | 34.9 | 35.0 | 35.1 |
| Viscosity at 25° C. (mPa · s) | 139 | 73 | 21 | 68 | 65 |
| Average particle diameter (nm) | 46 | 39 | 62 | 85 | 89 |

TABLE 2

|  | Comparative Example | | | |
|---|---|---|---|---|
|  | 1 | 2 | 3 | 4 |
| High molecular weight polyol (g) Polyol-1 | 377.0 | 188.5 | | 317.0 |
| Carboxyl group-containing low molecular weight glycol (g) DMBA | 111.6 | 55.8 | | |
| Organic diisocyanate (g) IPDI | 435.2 | 217.6 | | 183.0 |
| Carboxylic acid content of prepolymer (mmol/g) | 0.75 | 0.75 | — | 0.0 |
| Urethanation catalyst (g) DOTDL | 0.04 | 0.04 | | 0.04 |
| Diluent (g) DMFDG | 195 | 138 | | 208 |
| Isocyanate content of prepolymer solution (%) | 3.40 | 3.17 | — | 2.26 |
| Polyisocyanate (g) | | | | |
| Nonionic polyisocyanate NCO-2 | | | 1,000 | 500 |
| Non-nonionic polyisocyanate NCO-1 | | 200 | | |
| Prepolymer/polyisocyanate | 100/0 | 100/40 | 0/100 | 100/100 |
| Neutralizing agent (g) TEA (added before emulsification) | 76.2 | 38.1 | | |
| Dispersion medium and chain extension agent (g) Water | 1,430 | 1,031 | 1,447 | 1,613 |
| Production results | | | | |
| Name of aqueous polyurethane emulsion | PU-6 | PU-7 | PU-8 | PU-9 |
| Appearance | good | good | good | precipitate |
| Solid content (%) | 35.1 | 34.9 | 40.2 | |
| Viscosity at 25° C. (mPa · s) | 154 | 68 | 32 | |
| Average particle diameter (nm) | 35 | 66 | 195 | |

In Examples 1 to 5, Comparative Examples 1 to 4 and Tables 1 and 2, polyol-1 was polycarbonate diol having a number average molecular weight of 500 obtained from 1,6-hexanediol and diethyl carbonate, polyol-2 was polycarbonate diol having a number average molecular weight of 2,000 obtained from 1,6-hexanediol and diethyl carbonate, DMBA was 2,2-diemthylolbutanoic acid, IPDI was isophorone diisocyanate, DOTDL was dioctyltin laurate, DMFDG was dipropylene glycol dimethyl ether, TEA was triethylamine, IPDA was isophorone diamine, and MEA was monoethanolamine.

Evaluation of Aqueous One-component Coating Agent

Application Example 1

PU-1 was coated on an aluminum plate to a dry thickness of 50 μm, and after allowing to stand at room temperature for 2 hours, the coated agent was baked under conditions of 220° C. and 150 seconds to form a film, whereby an evaluation sample was obtained. The evaluation sample was subjected to the following evaluation test. The results are shown in Table 3. The film appearance was carried out according to the coated film appearance test of JIS K5400 with evaluation A for good and B for occurrence of cracks and breakage. The pencil hardness test was carried out according to the hand scratching method of the pencil scratching test of JIS K5400. The alkali resistance test was carried out in such a manner that one drop of a 5% sodium carbonate aqueous solution was placed on the film, on which a glass slide was placed, and after allowing to stand in this state at room temperature for 1 hour, the appearance of the film was evaluated with evaluation A for no change and B for occurrence of changes, such as whitening. The solvent resistance test was carried out in such a manner that the film surface was rubbed in 200 times with absorbent cotton having methyl ethyl ketone absorbed, and the appearance of the film was evaluated with evaluation A for no change and B for occurrence of changes, such as whitening.

Application Examples 2 to 5 and Comparative Application Examples 1 to 3

PU-2 to PU-8 were evaluated in the same manner as in Application Example 1. The results are shown in Table 3.

TABLE 3

|  | Application Example | | | | | Comparative Application Example | | |
|---|---|---|---|---|---|---|---|---|
|  | 1 | 2 | 3 | 4 | 5 | 1 | 2 | 3 |
| Aqueous polyurethane emulsion | PU-1 | PU-2 | PU-3 | PU-4 | PU-5 | PU-6 | PU-7 | PU-8 |
| Appearance of film | A | A | A | A | A | A | B | B |
| Pencil hardness | HB | HB | HB | 2B | 2B | HB | F | HB |
| Alkali resistance | A | A | A | A | A | B | A | A |
| Solvent resistance | A | A | A | A | A | B | A | A |

All the aqueous one-component coating agents using the aqueous polyurethane emulsions of Examples exhibited good results. In Comparative Examples, on the other hand, PU-6 was inferior in durability of the film due to nonuse of the polyisocyanate containing a nonionic polar group. PU-7 using the polyisocyanate a non-nonionic polar group and PU-8 using no isocyanate-terminated urethane prepolymer having a carboxyl group were inferior in appearance of the film.

The invention claimed is:

1. A method for producing polyurethane emulsion for an aqueous one-component coating agent, comprising:
    reacting an organic diisocyanate (a1), a polyol (a2) having a number average molecular weight of from 500 to 10,000 and a carbonate skeleton and a glycol containing a carboxyl group (a3) to produce an isocyanate-terminated urethane prepolymer having a carboxyl group (A), wherein the glycol containing a carboxyl group (a3) is selected from the group consisting of 2,2-dimethylolpropionic acid, 2,2-dimethylolbutanoic acid, 2,2-dimethylolbutyric acid and 2,2-dimethylolvaleric acid;
    mixing the urethane prepolymer (A) with a polyisocyanate obtained by a method selected from the group consisting of:
    (1) adding an isocyanuration catalyst to an aliphatic isocyanate and/or alicyclic isocyanate to effect an isocyanuration reaction, wherein the unreacted aliphatic isocyanate and/or alicyclic isocyanate is removed; and
    (2) reacting an aliphatic isocyanate and/or an alicyclic isocyanate with a low molecular weight polyol used for obtaining the polyester polyol, wherein an isocyanuration catalyst is added thereto to effect an isocyanuration reaction, followed by removing the unreacted aliphatic isocyanate and/or alicyclic isocyanate; and wherein, a part of the isocyanate group of the polyisocyanate obtained in the method (1) or (2) is further subjected to a urethanation reaction with a monofunctional or polyfunctional polyol; wherein the polyisocyanate contains a nonionic polar group (B);
    neutralizing the carboxyl group in the system with a neutralizing agent (C); and
    subjecting the mixture to emulsification in water and chain extension with water or an amine.

2. The production method according to claim 1, wherein the chain extension is carried out with water.

3. The production method according to claim 1, wherein the chain extension is carried out with an amine.

4. The production method according to claim 1, wherein the organic diisocyanate (a1) is an aliphatic diisocyanate and/or an alicyclic diisocyanate.

5. The production method according to claim 1, wherein the polyisocyanate containing a nonionic polar group (B) is an isocyanurate modified product, or a composite modified product including isocyanurate modification, of an aliphatic diisocyanate and/or an alicyclic diisocyanate.

* * * * *